Patented Sept. 8, 1931

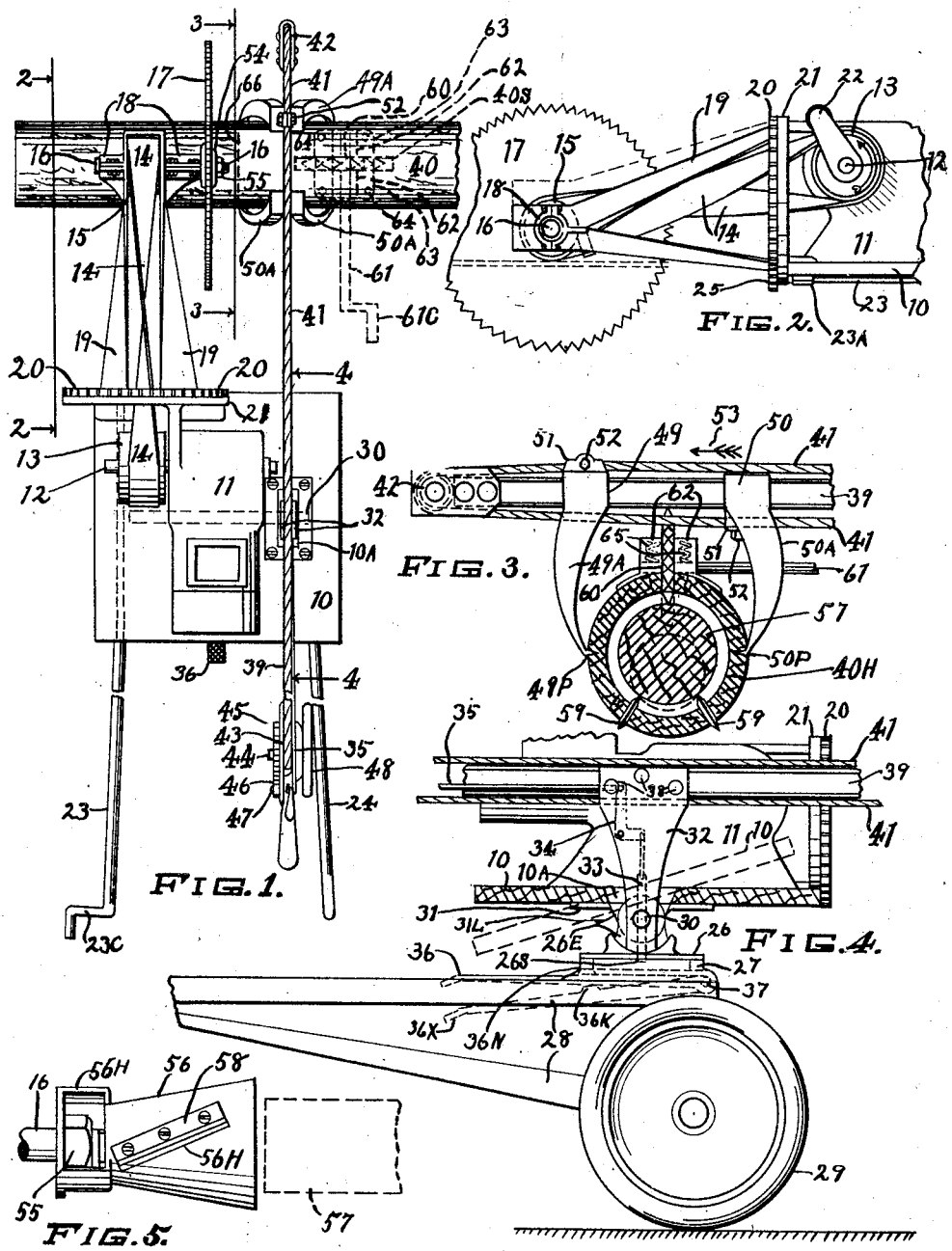

1,822,116

UNITED STATES PATENT OFFICE

BENNIE E. THOMPSON, OF LAKEVIEW, STILLWATER, MINNESOTA

PORTABLE SAWING MACHINE

Application filed April 11, 1927, Serial No. 182,645. Renewed February 2, 1931.

My invention relates to a portable sawing device adaptable for sawing timber laying on the ground and also to point certain size logs to be used for fence posts.

The object is to provide a simple and highly efficient portable sawing device which may be moved to operative position and is readily mounted on the rear truck end of an automobile chassis.

In the accompanying drawings:

Fig. 1 is a top view of my device in operative position to saw off a log.

Fig. 2 is a side elevation about as on line 2—2 in Fig. 1.

Fig. 3 is an enlarged sectional elevation of the log engaging means of my device as on line 3—3 in Fig. 1.

Fig. 4 is a sectional longitudinal elevation as on line 4—4 in Fig. 1 and showing my device mounted on the rear truck of a motor vehicle.

Fig. 5 is a top view of a post pointing attachment for my device.

Referring to the drawings by reference numerals, 10 designates a platform on which is fixed an engine 11 with a crank shaft 12 on which is a pulley 13 engaged by a belt 14 extending forward of the platform and engaging a driven pulley 15 on a shaft 16 on which is removably fixed a disc saw 17. Said shaft 16 is rotatably journaled in two horizontally spaced bearings 18 at the forward end of a horizontal U-shaped saw frame designated as 19 and the rear end of which comprises an integral vertically arranged rotary plate 20. Said plate is rotatably and fixedly secured to a like but stationary plate 21 fixed on platform 10 forward of the engine 11. 22 in Fig. 2 represents any suitable type of belt stretcher.

23 is a left hand and 24 a right hand handle bar extending rearwardly of the platform, the former preferably comprising a shaft journaled as 23A under the platform and extending forward to the plane of disc 20. Said disc is preferably a large gear the teeth of which are engaged by a pinion 25 fixed on the front end of bar 23, said latter bar having a crank 23C at its rear end for turning the bar, the pinion 25 and gear 20 which latter turns frame 19 so that saw 17 may be turned to any desired plane, for example to a horizontal plane for cutting standing trees, posts, etc.

26 is an upper turntable member oscillable on a casing 27 suitably fixed on the rear part of a truck chassis 28 of which 29 are the ground wheels. On top of member 26 are two vertical ears 26E in which is journaled a rock shaft 30 on which are journaled close to ears 26E the downwardly projecting lugs 31L of a bearing block 31 fixed to the under side of platform 10 (see Fig. 4). 32 is an upright bracket pivoted on shaft 30. 33 is a vertically slidable locking pin in said bracket and adapted to be drawn out of or pushed into a socket 26S in casting 27 which is ring shaped, by a bell crank 34 and a rearwardly extending reach rod 35 connected therewith. It is obvious that when pin 33 is in socket 26S the bracket 32 is held rigid and vertical.

36 is a longitudinal foot operated lever normally pressed upwardly and fulcrumed at 37 in the front part of casting 27 and having an upwardly directed key 36K arranged to engage in a notch 36N in the lower rear part of member 26 thus holding the member 26 and preventing horizontal oscillation of the platform 10. 10A is an aperture in platform 10 through which frame 32 projects upwardly and the upper part of said frame 32 is fixed as at 38 to a longitudinal, normally horizontal boom 39 which is preferably an I-beam. This boom extends forwardly slightly further than the saw 17 and rearwardly almost to the rear end of the handle 24, and carries log engaging means for the purpose of holding a log, as 40, rigid while the saw is cutting it parallel to and near the said log holding means.

Said log holding means comprise a single continuous cable 41 passing over a sheave 42 in the outer end of boom 39 parallel to said boom and one bight thereof above and the other bight thereof just below said boom and extending both rearwardly to a driving sheave 43 suitably mounted on a shaft 44 rotatably fixed in the rear end of the boom 39, (see Fig. 1). 45 is a ratchet gear keyed on shaft 44 and engaged by a pawl 46 pivoted at 47 to boom 39. 48 is a hand wheel also keyed on shaft 44 to turn sheave 43.

49 and 50 are pairs of slidable claw members comprising log engaging hooks reciprocable on boom 39 and the forward pair as 49 having downwardly directed arms 49A with rearwardly projecting prongs 49P while members 50 have like arms 50A with forwardly directed prongs 50P. Each member 49—50 has a socket part 51 to engage cable 41 one above the boom and one below the boom, being further secured to cable 41 by set screws 52 or equivalent means.

It will now be readily understood that when hand wheel 48 is manipulated to push the upper bight of cable 41 forward (see arrow 53 in Fig. 3), arm 49A will be pushed forward and simultaneously arm 50A will be moved rearwardly by the lower bight of the cable, thus spreading the claws or prongs 49P—50P. Turning wheel 48 the opposite way the claws are forced toward each other and their prongs engage opposite sides of a log 40 and hold it securely (see also Fig. 1). Thus the log is held solid and then the operator grasps the handles 23—24 and tilts the entire platform by raising said handles gradually until the saw has cut through the log, it being assumed of course that the engine 11 is running and driving the saw. It is obvious that after thus making a cut the claws 49—50 are readily released and the entire rig may be moved over to another cutting position on the same log.

To make a horizontal cut as through a standing tree trunk, the operator simply turns the saw to a horizontal plane by turning crank 23C which turns gear 20 through pinion 25. Then he releases the turn table by pressing lever 36 down with his foot as to position 36X in Fig. 4. Next he pulls rod 35 to release pin 33 which permits the platform to be swung to either side so that the saw 17 makes a horizontal cut in a tree either to the right or left of the frame 19.

In Fig. 1 is shown the usual washer 54 and nut 55 for clamping the saw in place on shaft 16 while in Fig. 5 the same nut 55 is shown as securing the hollow head 56H of a conical, hollow, post pointing member 56 adapted to receive a post 57 at its opening. 58 represents a knife blade detachably securable in an opening 56H in housing 56. There may be a plurality of these knives arranged circularly and in such position as to cut the end of the post 57 in a tapered form when the latter is pushed endwise into member 56. I also provide means for moving post 57 endwise, said means consisting of providing a hollow log or similar tubular member 40H (Fig. 3), held by the claws 49A and 50A. The post 57 is preferably retained concentrically within 40H on rollers 59 rotatably fixed therein. 60 is a toothed feed wheel arranged longitudinally in a slot 40S in the top of the tubular member 40H and rotated by a shaft 61 with a crank 61C, said shaft suitably journaled in a two-part bearing member 62 with flanges 63 fixed at 64 to the member 40H at opposite sides of slot 40S. The bearings 62 are preferably high and slotted vertically for suitable springs 65 or like means bearing down on shaft 61 and causing the feed wheel to frictionally engage post 57 and feed the latter out of the open end of member 56 (as in Fig. 5), it being understood that member 40H must terminate close to the holding jaws 49—50, as at line 66 in Fig. 1.

The operation of my device has already been fully disclosed in the foregoing description.

I claim:

1. In a portable sawing machine having a platform tiltably mounted on a suitable vehicle, handle bars projecting rearwardly from the platform, a saw frame mounted on the forward end of said platform, means at the front end of said saw frame for mounting a disc saw in spaced relation to the platform, power means on said platform and operative connection between said power means and the saw for rotating the latter; a log engaging device mounted on the tiltable platform and comprising a beam extending rearwardly and forwardly of the platform, its forward end in spaced horizontal relation to the saw, log hooks depending from and slidable on the forward end of the beam and toward each other to engage opposite sides of a log simultaneously and means for spreading and closing said log engaging hooks on the beam comprising a pulley at each end of the beam, a continuous cable passing over said pulleys with one bight thereof above and parallel to the beam and one bight likewise parallel but below the beam, one log engaging hook fixed to the upper bight and the other log engaging hook fixed to the lower bight and means for rotating the rear one of said pulleys.

2. The structure specified in claim 1 in which the front log engaging hooks comprise a single integral member slidable on the beam and the hook parts of which are arched downwardly and thence inwardly and terminating in log engaging prongs, and the rear log engaging hooks comprise a like member with two hook parts arched in the opposite direction and having prong termini adapted to engage the opposite side of a log.

In testimony whereof I affix my signature.

BENNIE E. THOMPSON.